(12) United States Patent
Lee et al.

(10) Patent No.: US 10,385,950 B2
(45) Date of Patent: Aug. 20, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Kyeong Hun Lee, Seoul (KR); Jong Sool Park, Hwaseong-si (KR); Jong Soo Kim, Seoul (KR); Dong Hwan Hwang, Seoul (KR); Jin Ho Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/017,792

(22) Filed: Jun. 25, 2018

(65) Prior Publication Data

US 2019/0063573 A1 Feb. 28, 2019

(30) Foreign Application Priority Data

Aug. 30, 2017 (KR) ........................ 10-2017-0110175

(51) Int. Cl.
*F16H 37/04* (2006.01)
*F16H 3/66* (2006.01)
(52) U.S. Cl.
CPC ............. *F16H 37/04* (2013.01); *F16H 3/666* (2013.01); *F16H 2037/047* (2013.01); *F16H 2200/006* (2013.01); *F16H 2200/2012* (2013.01); *F16H 2200/2043* (2013.01)

(58) Field of Classification Search
CPC .... F16H 3/666; F16H 37/04; F16H 2037/047; F16H 2200/006; F16H 2200/2012; F16H 2200/2043
USPC ........................................................ 475/275
See application file for complete search history.

(56) References Cited

U.S. PATENT DOCUMENTS

| | | | | |
|---|---|---|---|---|
| 9,217,494 | B2 * | 12/2015 | Hoffman | F16H 3/66 |
| 9,951,848 | B2 * | 4/2018 | Lee | F16H 3/663 |
| 10,047,835 | B2 * | 8/2018 | Kim | F16H 3/66 |
| 10,184,552 | B2 * | 1/2019 | Lee | F16H 37/04 |
| 2018/0163822 | A1 * | 6/2018 | Hwang | F16H 3/62 |
| 2018/0163824 | A1 * | 6/2018 | Kim | F16H 3/666 |

(Continued)

*Primary Examiner* — Leslie A Nicholson, III
(74) *Attorney, Agent, or Firm* — Morgan, Lewis & Bockius LLP

(57) ABSTRACT

A planetary gear train of an automatic transmission may include first to fourth planetary gear sets having first to third, fourth to sixth, seventh to ninth, and eighth to twelfth elements, the first to third gear sets being mounted on an input shaft, the fourth gear set being mounted on an output shaft, a first shaft connected to first and sixth elements, a second shaft connected to second and ninth elements and input shaft, a fourth shaft connected to fourth and seventh elements, third, fifth, and sixth shafts connected to third, fifth, and eighth elements respectively, a seventh shaft connected to tenth element, and externally gear-meshed with fifth shaft, an eighth shaft connected to eleventh element and output shaft, and externally gear-meshed with sixth shaft selectively, a ninth shaft connected to the twelfth element, and two transfer gears each forming external gear-engagement between a corresponding pair of shafts.

13 Claims, 3 Drawing Sheets

(56) References Cited

U.S. PATENT DOCUMENTS

2018/0163825 A1\* 6/2018 Kim ................. F16H 3/666
2018/0163831 A1\* 6/2018 Kim ................. F16H 37/04
2018/0363734 A1\* 12/2018 Lee ................. F16H 3/666

\* cited by examiner

FIG. 2

| Shift-stage | Clutch | | | Brake | | Gear ratio | Step ratio | Remark |
| --- | --- | --- | --- | --- | --- | --- | --- | --- |
| | C1 | C2 | C3 | B1 | B2 | | | |
| REV | | | ● | | ● | -3.729 | | Gear ratio span : 9.27<br>Gear ratio of R/D1 : -0.62 |
| N | ● | | | ● | ● | - | - | |
| D1 | ● | ● | | ● | ● | 6.043 | - | |
| D2 | | ● | | ● | ● | 3.754 | 1.610 | |
| D3 | ● | ● | | | ● | 2.48 | 1.514 | |
| D4 | ● | | ● | | ● | 1.905 | 1.302 | |
| D5 | ● | ● | ● | | ● | 1.367 | 1.394 | |
| D6 | | ● | ● | | | 1 | 1.367 | |
| D7 | | | ● | ● | | 0.837 | 1.195 | |
| D8 | | ● | ● | ● | | 0.652 | 1.284 | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2017-0110175 filed on Aug. 30, 2017, the entire contents of which is incorporated herein for all purposes by this reference.

BACKGROUND OF THE INVENTION

Field of the Invention

The present invention relates to an automatic transmission for a vehicle.

Description of Related Art

Recently, increase of oil price is triggering a hard competition in enhancing fuel consumption of a vehicle.

In this sense, research on an automatic transmission has been performed to simultaneously provide better drivability and fuel consumption by achieving more shift stages.

To achieve more shift stages for an automatic transmission, the number of parts is typically increased, which may deteriorate installability, production cost, weight and/or power flow efficiency.

Therefore, to maximally enhance fuel consumption of an automatic transmission having more shift stages, it is important for better efficiency to be derived by fewer number of parts.

In this background, an eight-speed automatic transmission has been introduced recently and a planetary gear train for an automatic transmission facilitating more shift-stages is under investigation.

An automatic transmission of eight or more shift-stages typically may include three to four planetary gear sets and five to six engagement elements (friction elements), and may easily become lengthy, deteriorating installability.

In this regard, disposing planetary gear sets in parallel or employing dog clutches instead of wet-type engagement elements is sometimes attempted. However, such an arrangement may not be widely applicable, and using dog clutches may easily deteriorate shift-feel.

In addition, a recent eight-speed automatic transmission typically shows a gear ratio span in a level of 6.5 to 7.5, which may require improvement for better fuel consumption.

Thus, shortening a length of an automatic transmission without deteriorating performance will be beneficial.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle facilitating at least eight forward speeds and one reverse speed, providing better performance and fuel efficiency of a vehicle.

An exemplary planetary gear train of an automatic transmission for a vehicle may include a first planetary gear set having first, second, and third rotation elements, a second planetary gear set having fourth, fifth, and sixth rotation elements, a third planetary gear set having seventh, eighth, and ninth rotation elements, a fourth planetary gear set having tenth, eleventh, and twelfth rotation elements, an input shaft mounted with the first, second, and third planetary gear sets on an external circumference of the input shaft, and an output shaft disposed in parallel with the input shaft and mounted with the fourth planetary gear set on an external circumference of the output shaft. The exemplary planetary gear train may further include a first shaft fixedly connected to the first rotation element and the sixth rotation element, a second shaft fixedly connected to the second rotation element and the ninth rotation element, and fixedly connected to the input shaft, a third shaft fixedly connected to the third rotation element, a fourth shaft fixedly connected to the fourth rotation element and the seventh rotation element, a fifth shaft fixedly connected to the fifth rotation element, a sixth shaft fixedly connected to the eighth rotation element, a seventh shaft fixedly connected to the tenth rotation element, and externally gear-meshed with the fifth shaft, an eighth shaft fixedly connected to the eleventh rotation element, externally gear-meshed with the sixth shaft selectively, and fixedly connected to the output shaft, a ninth shaft fixedly connected to the twelfth rotation element, and two transfer gears each forming external gear-engagement between a corresponding pair of shafts.

The third shaft may be selectively connectable to the fourth shaft and the sixth shaft, respectively, and the first shaft and the ninth shaft may be selectively connectable to the transmission housing, respectively.

The two transfer gears may include a first transfer gear disposed between the fifth shaft and the seventh shaft, and a second transfer gear disposed between the sixth shaft and the eighth shaft.

The exemplary planetary gear train may further include a first clutch disposed between the sixth shaft and the second transfer gear, a second clutch disposed between the third shaft and the fourth shaft, a third clutch disposed between the third shaft and the sixth shaft, a first brake disposed between the first shaft and the transmission housing, and a second brake disposed between the ninth shaft and the transmission housing.

The exemplary planetary gear train may further include a first clutch disposed between the eighth shaft and the second transfer gear, a second clutch disposed between the third shaft and the fourth shaft, a third clutch disposed between the third shaft and the sixth shaft, a first brake disposed between the first shaft and the transmission housing, and a second brake disposed between the ninth shaft and the transmission housing.

The first, second, and third rotation elements of the first planetary gear set may be a first sun gear, a first planet carrier, and a first ring gear of the first planetary gear set, respectively. The fourth, fifth, and sixth rotation elements of the second planetary gear set may be second sun gear, a second planet carrier, and a second ring gear of the second planetary gear set, respectively. The seventh, eighth, and ninth rotation elements of the third planetary gear set may be a third sun gear, a third planet carrier, and a third ring gear of the third planetary gear set, respectively. The tenth, eleventh, and twelfth rotation elements of the fourth planetary gear set may be a fourth sun gear, a fourth ring gear, and a fourth planet carrier of the fourth planetary gear set, respectively.

The first, second, and third planetary gear sets may be disposed in the order of first, third, and second planetary gear sets.

According to an exemplary planetary gear train, four planetary gear sets may be dividedly disposed on input shaft and output shaft that are in parallel, enhancing overall length and improving installability in a vehicle.

Furthermore, an exemplary planetary gear train employs two transfer gears in addition planetary gear sets, and thereby optimal gear ratios may be obtained for respective types of vehicles by altering the number of gear teeth of the transfer gears in a wide range. Furthermore, acceleration performance may be optimized by setting appropriate gear ratios.

Furthermore, a planetary gear train according to an exemplary embodiment of the present invention may achieve a gear ratio span of at least 9.27 while achieving eight forward speeds and one reverse speed, maximizing an engine driving efficiency.

Furthermore, multiple shift-stages are realized with high efficiency, and step ratios of shift-stages may become more linear, improving acceleration and engine drivability before and after a shifting.

Furthermore, a planetary gear train according to an exemplary embodiment of the present invention employs minimally five engagement elements, reducing material cost by reducing required number of parts. Furthermore, the number of non-acting engagement elements are minimized at each shift-stages, reducing drag loss of engagement elements, and accordingly improving power delivery efficiency and fuel consumption.

Furthermore, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart for respective engagement elements at respective shift-stages in a planetary gear train according to various exemplary embodiments of the present invention.

Figure 1:
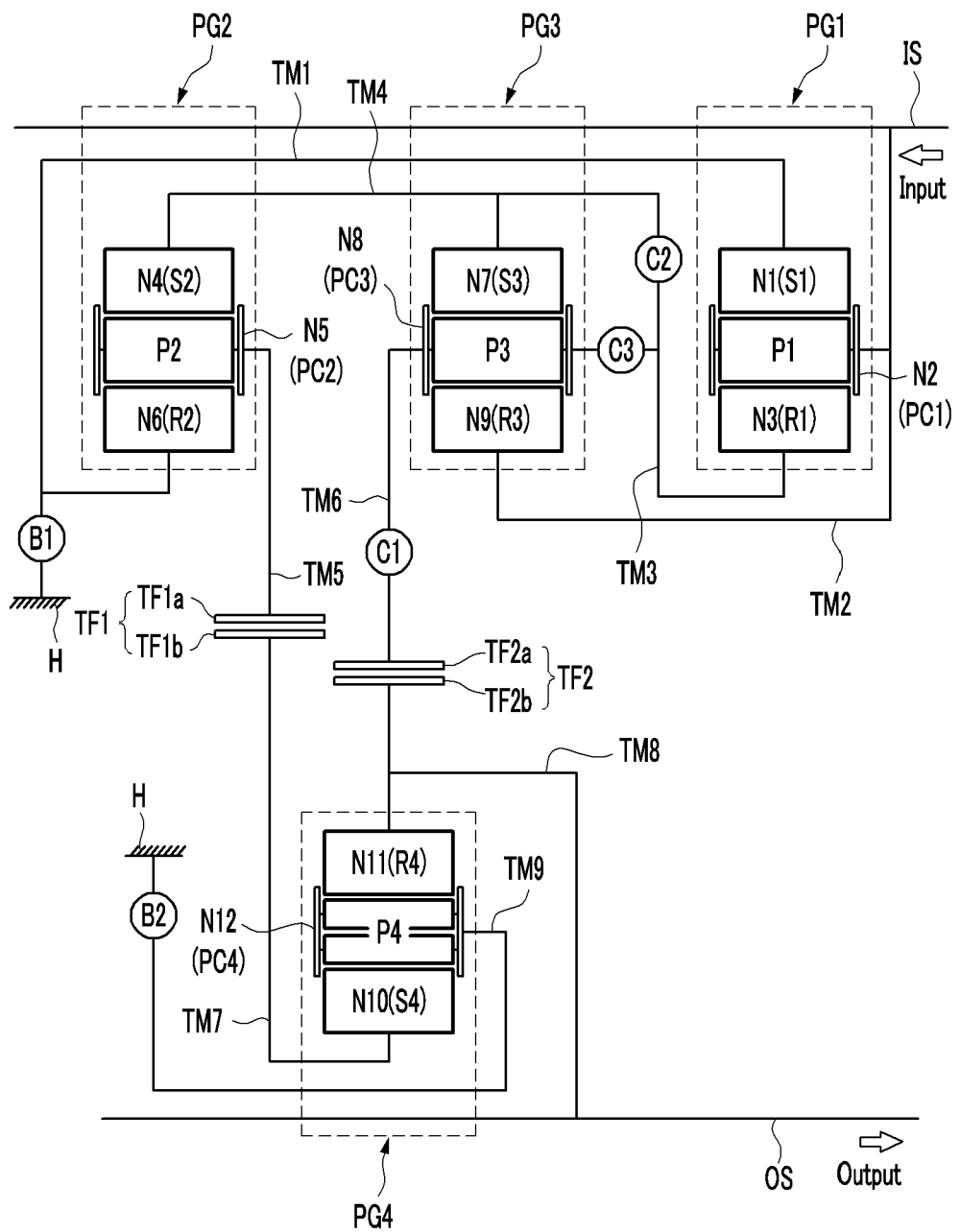
FIG. 1 is a schematic diagram of a planetary gear train according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will be hereinafter described in detail with reference to the accompanying drawings. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a planetary gear train according to various exemplary embodiments of the present invention.

Referring to FIG. 1, a planetary gear train according to various exemplary embodiments of the present invention includes an input shaft IS, an output shaft OS, first, second, third and fourth planetary gear sets PG1, PG2, PG3, and PG4, two transfer gears TF1 and TF2, and engagement elements of three clutches C1, C2, and C3 and two brakes B1 and B2.

The input shaft IS is an input member and the torque from a crankshaft of an engine is input into the input shaft IS, after being torque-converted through a torque converter.

The output shaft OS is an output element, and, disposed in parallel with the input shaft IS, outputs a shifted driving torque to a driveshaft through a differential apparatus.

The first, second, and third planetary gear sets PG1, PG2, and PG3, forming a main shifting portion, are disposed along an external circumference of the input shaft IS, and are disposed in the order of the first, third, and second planetary gear sets PG1, PG3, and PG2, from an input side thereof.

The fourth planetary gear set PG4 is disposed along an external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a double pinion planetary gear set, and includes a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear S4 acts as a tenth rotation element N10, the fourth ring gear R4 acts as an eleventh rotation element N11, and the fourth planet carrier PC4 acts as a twelfth rotation element N12.

In the arrangement of the first, second, and third planetary gear sets PG1, PG2, and PG3, the first rotation element N1 (the first sun gear S1) is fixedly connected to the sixth rotation element N6 (the second ring gear R2), the second rotation element N2 (the first planet carrier PC1) is fixedly connected to the ninth rotation element N9 (the third ring gear R3), and the fourth rotation element N4 (the second sun gear S2) is fixedly connected to the seventh rotation element N7, forming six shafts TM1 to TM6.

Regarding the fourth planetary gear set PG4, the rotation elements N10 to N12 of may act independently, forming three shafts TM7 to TM9.

The nine shafts TM1 to TM9 are hereinafter described in detail.

The first shaft TM1 is fixedly connected to the first rotation element N1 (first sun gear S1) and the sixth rotation element N6 (second ring gear R2), and selectively connectable to a transmission housing H.

The second shaft TM2 is fixedly connected to the second rotation element N2 (first planet carrier PC1) and the ninth rotation element N9 (third ring gear R3), and fixedly connected to the input shaft IS, always acting as an input element.

The third shaft TM3 is fixedly connected to the third rotation element N3 (first ring gear R1).

The fourth shaft TM4 is fixedly connected to the fourth rotation element N4 (second sun gear S2) and the seventh rotation element N7 (third sun gear S3), and selectively connectable to the third shaft TM3.

The fifth shaft TM5 is fixedly connected to the fifth rotation element N5 (second planet carrier PC2).

The sixth shaft TM6 is fixedly connected to the eighth rotation element N8 (third planet carrier PC3), and selectively connectable to the third shaft TM3.

The seventh shaft TM7 is fixedly connected to the tenth rotation element N10 (fourth sun gear S4), and externally gear-meshed with the fifth shaft TM5.

The eighth shaft TM8 is fixedly connected to the eleventh rotation element N11 (fourth ring gear R4), externally gear-meshed with the sixth shaft TM6 selectively, and fixedly connected to the output shaft OS thereby always acting as an output element.

The ninth shaft TM9 is fixedly connected to the twelfth rotation element N12 (fourth planet carrier PC4), and selectively connectable to the transmission housing H.

The two transfer gears TF1 and TF2 delivers a shifted torque of the main shifting portion (first, second, and third planetary gear sets PG1, PG2, and PG3) to the auxiliary shifting portion (fourth planetary gear set PG4).

The first transfer gear TF1 includes a first transfer drive gear TF1a and first transfer driven gear TF1b, where the first transfer drive gear TF1a is connected to the fifth shaft TM5, and the first transfer driven gear TF1b is connected to the seventh shaft TM7, whereby the first transfer gear TF1 externally gear-meshes the fifth shaft TM5 and the seventh shaft TM7.

The second transfer gear TF2 includes a second transfer drive gear TF2a and a second transfer driven gear TF2b, where the second transfer drive gear TF2a is connected to the sixth shaft TM6, the second transfer driven gear TF2b is connected to the eighth shaft TM8, whereby the second transfer gear TF2 externally gear-meshes the sixth shaft TM6 and the eighth shaft TM8.

As a result, respective shafts connected by the first and second transfer gears TF1 and TF2 rotate in opposite directions, and the gear ratios of the first and second transfer gears TF1 and TF2 may be predetermined in consideration of required speed ratio of the transmission.

Each of the nine shafts TM1 to TM9 may be a rotation member that fixedly interconnects the input and output shafts and rotation elements of the planetary gear sets PG1, PG2, PG3, and PG4, or may be a rotation member that selectively interconnects a rotation element to the transmission housing H, or may be a fixed member fixed to the transmission housing H.

In the disclosure, when two or more members are described to be "fixedly connected", where each of the members may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged. It may be understood that in the case that a member is "selectively connectable" with a transmission housing by an engagement element, the member may be stationary when the engagement element is engaged.

The engagement elements include the three clutches C1, C2, and C3 and the two brakes B1 and B2, and are disposed as follows.

The first clutch C1 is disposed between the sixth shaft TM6 and the second transfer gear TF2, such that the sixth shaft TM6 and the second transfer gear TF2 may selectively become integral.

The second clutch C2 is disposed between the third shaft TM3 and the fourth shaft TM4, such that the third shaft TM3 and the fourth shaft TM4 may selectively become integral.

The third clutch C3 is disposed between the third shaft TM3 and the sixth shaft TM6, such that the third shaft TM3 and the sixth shaft TM6 may be selectively interconnected.

The first brake B1 is disposed between the first shaft TM1 and the transmission housing H, such that the first shaft TM1 may selectively act as a fixed element.

The second brake B2 is disposed between the ninth shaft TM9 and the transmission housing H, such that the ninth shaft TM9 may selectively act as a fixed element.

The engagement elements of the first, second, and third clutches C1, C2, and C3 and the first and second brakes B1 and B2 may be realized as multi-plate hydraulic pressure friction devices that are frictionally engaged by hydraulic pressure, however, it may not be understood to be limited thereto, since various other configuration that are electrically controllable may be available.

FIG. 2 is an operation chart for respective engagement elements at respective shift-stages in a planetary gear train according to various exemplary embodiments of the present invention.

Referring to FIG. 2, a planetary gear train according to various exemplary embodiments realizes shifting by operating three elements among the engagement elements of the first, second, and third clutches C1, C2, and C3 and the first and second brakes B1 and B2.

[The First Forward Speed]

In the first forward speed D1, the first clutch C1 and the first and second brakes B1 and B2 are simultaneously operated.

As a result, the sixth shaft TM6 is connected to the second transfer gear TF2 by the operation of the first clutch C1, torque of the input shaft IS is input to the second shaft TM2, and first and ninth shafts TM1 and TM9 act as a fixed element by the operation of the first and second brakes B1 and B2, realizing the first forward speed by cooperative operation of respective shafts and outputting a shifted torque to the output shaft OS connected to the eighth shaft TM8.

[The Second Forward Speed]

In the second forward speed D2, the second clutch C2 and the first and second brakes B1 and B2 are simultaneously operated.

As a result, the third shaft TM3 is connected to the fourth shaft TM4 by the operation of the second clutch C2, torque of the input shaft IS is input to the second shaft TM2, and the first and ninth shafts TM1 and TM9 act as a fixed element by the operation of the first and second brakes B1 and B2, realizing the second forward speed by cooperative operation of respective shafts and outputting a shifted torque to the output shaft OS connected to the eighth shaft TM8.

[The Third Forward Speed]

In the third forward speed D3, the first and second clutch C1 and C2 and the second brake B2 are simultaneously operated.

As a result, the sixth shaft TM6 is connected to the second transfer gear TF2 by the operation of the first clutch C1, and the third shaft TM3 is connected to the fourth shaft TM4 by the operation of the second clutch C2. In the instant state, torque of the input shaft IS is input to the second shaft TM2, and the ninth shaft TM9 acts as a fixed element by the operation of the second brake B2, realizing the third forward speed by cooperative operation of respective shafts and outputting a shifted torque to the output shaft OS connected to the eighth shaft TM8.

[The Fourth Forward Speed]

In the fourth forward speed D4, the second and third clutches C2 and C3 and the second brake B2 are simultaneously operated.

As a result, the third shaft TM3 is connected to the fourth shaft TM4 by the operation of the second clutch C2, and the third shaft TM3 is connected to the sixth shaft TM6 by the operation of the third clutch C3. In the instant state, torque of the input shaft IS is input to the second shaft TM2, and the ninth shaft TM9 acts as a fixed element by the operation of the second brake B2, realizing the fourth forward speed by cooperative operation of respective shafts and outputting a shifted torque to the output shaft OS connected to the eighth shaft TM8.

[The Fifth Forward Speed]

In the fifth forward speed D5, the first and third clutches C1 and C3 and the second brake B2 are simultaneously operated.

As a result, the sixth shaft TM6 is connected to the second transfer gear TF2 by the operation of the first clutch C1, and the third shaft TM3 is connected to the sixth shaft TM6 by the operation of the third clutch C3. In the instant state, torque of the input shaft IS is input to the second shaft TM2, and the ninth shaft TM9 acts as a fixed element by the operation of the second brake B2, realizing the fifth forward speed by cooperative operation of respective shafts and outputting a shifted torque to the output shaft OS connected to the eighth shaft TM8.

[The Sixth Forward Speed]

In the sixth forward speed D6, the first, second, and third clutches C1, C2, and C3 are simultaneously operated.

As a result, the sixth shaft TM6 is connected to the second transfer gear TF2 by the operation of the first clutch C1, the third shaft TM3 is connected to the fourth shaft TM4 by the operation of the second clutch C2, and the third shaft TM3 is connected to the sixth shaft TM6 by the operation of the third clutch C3. In the instant state, torque of the input shaft IS is input to the second shaft TM2, realizing the sixth forward speed by cooperative operation of respective shafts and outputting a shifted torque to the output shaft OS connected to the eighth shaft TM8.

[The Seventh Forward Speed]

In the seventh forward speed D7, the first and third clutches C1 and C3 and the first brake B1 are simultaneously operated.

As a result, the sixth shaft TM6 is connected to the second transfer gear TF2 by the operation of the first clutch C1, and the third shaft TM3 is connected to the sixth shaft TM6 by the operation of the third clutch C3. In the instant state, torque of the input shaft IS is input to the second shaft TM2, and the first shaft TM1 acts as a fixed element by the operation of the first brake B1, realizing the seventh forward speed by cooperative operation of respective shafts and outputting a shifted torque to the output shaft OS connected to the eighth shaft TM8.

[The Eighth Forward Speed]

In the eighth forward speed D8, the second and third clutches C2 and C3 and the first brake B1 are simultaneously operated.

As a result, the third shaft TM3 is connected to the fourth shaft TM4 by the operation of the second clutch C2, and the third shaft TM3 is connected to the sixth shaft TM6 by the operation of the third clutch C3. In the instant state, torque of the input shaft IS is input to the second shaft TM2, and the first shaft TM1 acts as a fixed element by the operation of the first brake B1, realizing the eighth forward speed by cooperative operation of respective shafts and outputting a shifted torque to the output shaft OS connected to the eighth shaft TM8.

[The Reverse Speed]

In the reverse speed REV, the third clutch C3 and the first and second brakes B1 and B2 are simultaneously operated.

As a result, the third shaft TM3 is connected to the sixth shaft TM6 by the operation of the third clutch C3, and a torque of the input shaft IS is input to the second shaft TM2. In the instant state, the first and ninth shafts TM1 and TM9 act as a fixed element by the operation of the first and second brakes B1 and B2, realizing the reverse speed by cooperative operation of respective shafts and outputting a shifted torque to the output shaft OS connected to the eighth shaft TM8.

Figure 3:
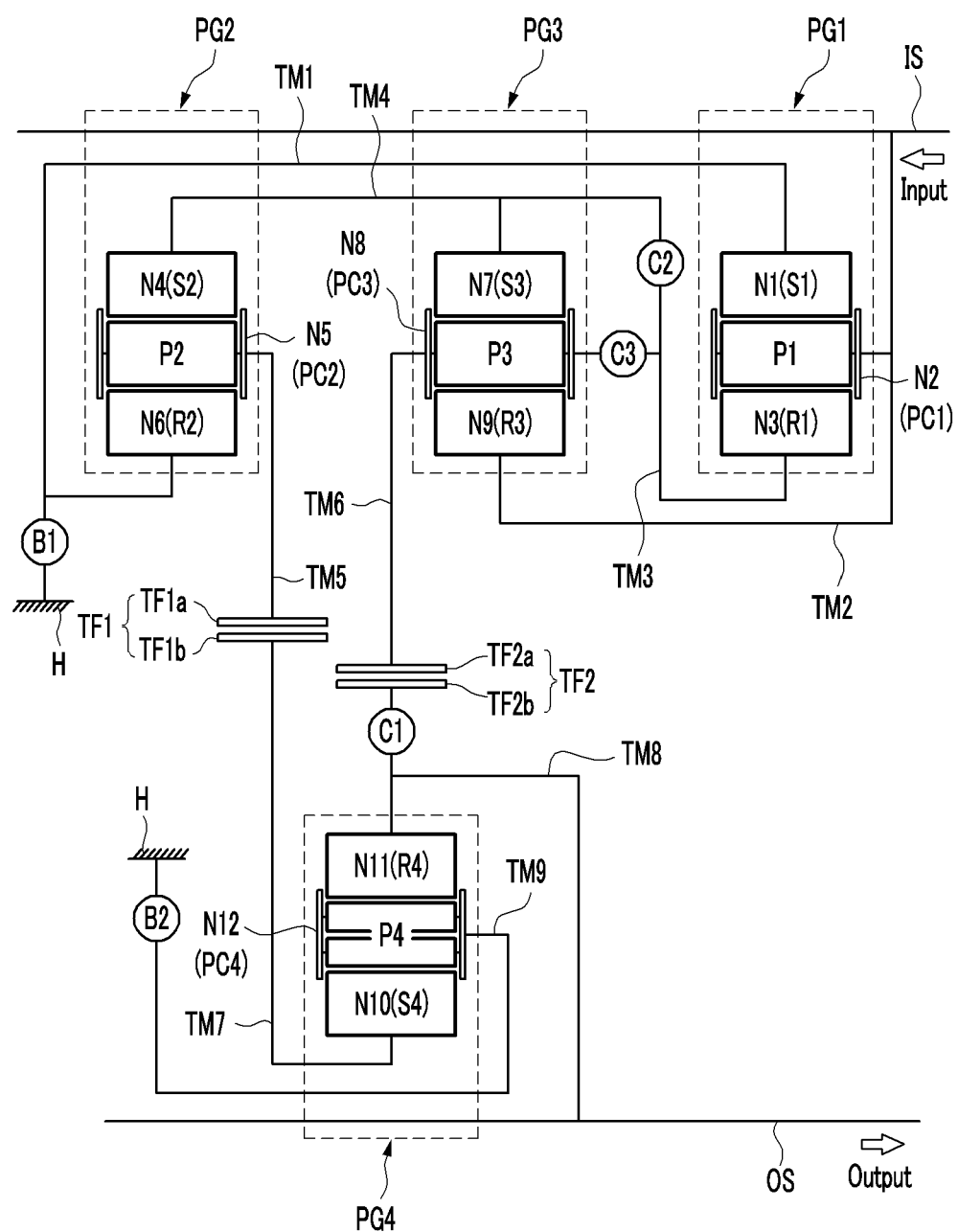
FIG. 3 is a schematic diagram of a planetary gear train according to various exemplary embodiments of the present invention.

FIG. 3 is a schematic diagram of a planetary gear train according to various exemplary embodiments of the present invention.

In a planetary gear train according to various exemplary embodiments shown in FIG. 1, the first clutch C1 is disposed between the sixth shaft TM6 and the second transfer gear TF2. In a planetary gear train according to various exemplary embodiments shown in FIG. 3, the first clutch C1 is disposed between the eighth shaft TM8 and the second transfer gear TF2.

Although the planetary gear train according to various exemplary embodiments differs from a planetary gear train according to various exemplary embodiments only in the location of the first clutch C1, and operations and functions of the planetary gear train remain the same.

As described above, a planetary gear train according to an exemplary embodiment of the present invention realizes eight forward speeds and one reverse speed by combination of four planetary gear sets PG1, PG2, PG3, and PG4 disposed on input and output shafts disposed in parallel, two transfer gears TF1 and TF2, and engagement elements of three clutches C1, C2, and C3 and two brakes B1 and B2. By such an arrangement, fuel consumption may be improved by improving power delivery performance, and installability may be improved by reducing a length.

Furthermore, an exemplary planetary gear train employs two transfer gears in addition planetary gear sets, and thereby optimal gear ratios may be obtained for respective types of vehicles by altering the number of gear teeth of the transfer gears in a wide range. Furthermore, acceleration performance may be optimized by setting appropriate gear ratios.

Furthermore, a planetary gear train according to an exemplary embodiment of the present invention may achieve a gear ratio span of at least 9.27 while achieving eight forward speeds and one reverse speed, maximizing an engine driving efficiency.

Furthermore, multiple shift-stages are realized with high efficiency, and step ratios of shift-stages may become more linear, improving acceleration and engine drivability before and after a shifting.

Furthermore, a planetary gear train according to an exemplary embodiment of the present invention employs minimally five engagement elements, reducing material cost by reducing required number of parts. Furthermore, the number of non-acting engagement elements are minimized at each shift-stages, reducing drag loss of engagement elements, and accordingly improving power delivery efficiency and fuel consumption.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the apparatus comprising:
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element;
   an input shaft mounted with the first, second, and third planetary gear sets along an external circumference of the input shaft;
   an output shaft disposed in parallel with the input shaft and mounted with the fourth planetary gear set on an external circumference of the output shaft,
   a first shaft fixedly connected to the first rotation element and the sixth rotation element;
   a second shaft fixedly connected to the second rotation element and the ninth rotation element, and fixedly connected to the input shaft;
   a third shaft fixedly connected to the third rotation element;
   a fourth shaft fixedly connected to the fourth rotation element and the seventh rotation element;
   a fifth shaft fixedly connected to the fifth rotation element;
   a sixth shaft fixedly connected to the eighth rotation element;
   a seventh shaft fixedly connected to the tenth rotation element, and externally gear-engaged with the fifth shaft;
   an eighth shaft fixedly connected to the eleventh rotation element, externally gear-engaged with the sixth shaft selectively, and fixedly connected to the output shaft;
   a ninth shaft fixedly connected to the twelfth rotation element; and
   two transfer gears each forming external gear-engagement between a corresponding pair among the first to ninth shafts.

2. The planetary gear train apparatus of claim 1, wherein the third shaft is selectively connectable to the fourth shaft or the sixth shaft, respectively; and
   each of the first shaft and the ninth shaft is selectively connectable to a transmission housing.

3. The planetary gear train apparatus of claim 2, wherein the two transfer gears comprise:
   a first transfer gear disposed between the fifth shaft and the seventh shaft; and
   a second transfer gear disposed between the sixth shaft and the eighth shaft.

4. The planetary gear train apparatus of claim 3, further including:

a first clutch mounted between the sixth shaft and the second transfer gear;
a second clutch mounted between the third shaft and the fourth shaft;
a third clutch mounted between the third shaft and the sixth shaft;
a first brake mounted between the first shaft and the transmission housing; and
a second brake mounted between the ninth shaft and the transmission housing.

5. The planetary gear train apparatus of claim 3, further including:
a first clutch mounted between the eighth shaft and the second transfer gear;
a second clutch mounted between the third shaft and the fourth shaft;
a third clutch mounted between the third shaft and the sixth shaft;
a first brake mounted between the first shaft and the transmission housing; and
a second brake mounted between the ninth shaft and the transmission housing.

6. The planetary gear train apparatus of claim 1, wherein
the first rotation element, the second rotation element, and the third rotation element of the first planetary gear set are a first sun gear, a first planet carrier, and a first ring gear of the first planetary gear set, respectively;
the fourth rotation element, the fifth rotation element, and the sixth rotation element of the second planetary gear set are a second sun gear, a second planet carrier, and a second ring gear of the second planetary gear set, respectively;
the seventh rotation element, the eighth rotation element, and the ninth rotation element of the third planetary gear set are a third sun gear, a third planet carrier, and a third ring gear of the third planetary gear set, respectively; and
the tenth rotation element, the eleventh rotation element, and the twelfth rotation element of the fourth planetary gear set are a fourth sun gear, a fourth ring gear, and a fourth planet carrier of the fourth planetary gear set, respectively.

7. The planetary gear train apparatus of claim 1, wherein the first, second, and third planetary gear sets are disposed in an order of first, third, and second planetary gear sets.

8. A planetary gear train apparatus of an automatic transmission for a vehicle, the apparatus comprising:
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, and a ninth rotation element;
a fourth planetary gear set having a tenth rotation element, an eleventh rotation element, and a twelfth rotation element;
an input shaft mounted with the first, second, and third planetary gear sets along an external circumference of the input shaft; and
an output shaft disposed in parallel with the input shaft and mounted with the fourth planetary gear set on an external circumference of the output shaft,
wherein the first rotation element is fixedly connected to the sixth rotation element,
the second rotation element is fixedly connected to the ninth rotation element, and fixedly connected to the input shaft,
the fourth rotation element is fixedly connected to the seventh rotation element,
the third rotation element is selectively connectable to the seventh rotation element or the eighth rotation element, respectively,
the fifth rotation element is externally gear-engaged with the tenth rotation element,
the eighth rotation element is externally gear-engaged with the eleventh rotation element selectively, and
the eleventh rotation element is fixedly connected to the output shaft.

9. The planetary gear train apparatus of claim 8, wherein
the sixth rotation element is selectively connectable to a transmission housing;
the twelfth rotation element is selectively connectable to the transmission housing;
a first transfer gear is disposed between the fifth rotation element and the tenth rotation element; and
a second transfer gear is disposed between the eighth rotation element and the eleventh rotation element.

10. The planetary gear train apparatus of claim 9, further including:
a first clutch selectively connecting the eighth rotation element and the second transfer gear;
a second clutch selectively connecting the third rotation element and the seventh rotation element;
a third clutch selectively connecting the third rotation element and the eighth rotation element;
a first brake selectively connecting the sixth rotation element and the transmission housing; and
a second brake selectively connecting the twelfth rotation element and the transmission housing.

11. The planetary gear train apparatus of claim 9, further including:
a first clutch selectively connecting the eleventh rotation element and the second transfer gear;
a second clutch selectively connecting the third rotation element and the seventh rotation element;
a third clutch selectively connecting the third rotation element and the eighth rotation element;
a first brake selectively connecting the sixth rotation element and the transmission housing; and
a second brake selectively connecting the twelfth rotation element and the transmission housing.

12. The planetary gear train apparatus of claim 8, wherein
the first rotation element, the second rotation element, and the third rotation element of the first planetary gear set are the first sun gear, the first planet carrier, and the first ring gear of the first planetary gear set, respectively;
the fourth rotation element, the fifth rotation element, and the sixth rotation element of the second planetary gear set are the second sun gear, the second planet carrier, and the second ring gear of the second planetary gear set, respectively;
the seventh rotation element, the eighth rotation element, and the ninth rotation element of the third planetary gear set are the third sun gear, the third planet carrier, and the third ring gear of the third planetary gear set, respectively; and
the tenth rotation element, the eleventh rotation element, and the twelfth rotation element of the fourth planetary gear set are the fourth sun gear, the fourth ring gear, and the fourth planet carrier of the fourth planetary gear set, respectively.

13. The planetary gear train apparatus of claim 8, wherein first, second, and third planetary gear sets are disposed in an order of the first, third, and second planetary gear sets.

\* \* \* \* \*